US011878583B2

(12) United States Patent
Barillot et al.

(10) Patent No.: US 11,878,583 B2
(45) Date of Patent: Jan. 23, 2024

(54) AXLE SYSTEM FOR A VEHICLE AND MOUNTING PROCESS

(71) Applicant: VOLVO TRUCK CORPORATION, Gothenburg (SE)

(72) Inventors: Thomas Barillot, Mornant (FR); Serge Vananty, Chassieu (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 470 days.

(21) Appl. No.: 17/280,323

(22) PCT Filed: Oct. 1, 2018

(86) PCT No.: PCT/EP2018/076585
§ 371 (c)(1),
(2) Date: Mar. 26, 2021

(87) PCT Pub. No.: WO2020/069714
PCT Pub. Date: Apr. 9, 2020

(65) Prior Publication Data
US 2022/0032768 A1    Feb. 3, 2022

(51) Int. Cl.
*F16H 48/40* (2012.01)
*B60K 17/36* (2006.01)
(Continued)

(52) U.S. Cl.
CPC ............ *B60K 17/36* (2013.01); *B60K 17/165* (2013.01); *F16C 33/7886* (2013.01);
(Continued)

(58) Field of Classification Search
CPC ............... F16H 48/36; F16H 2048/082; F16H 2048/364; F16H 2048/405; F16H 48/40;
(Continued)

(56) References Cited

U.S. PATENT DOCUMENTS 2,808,739 A * 10/1957 Mueller ................. F16H 48/27
475/89
4,004,472 A    1/1977 Millward et al.
(Continued)

FOREIGN PATENT DOCUMENTS

CN    101513824 A    8/2009
CN    102361773 A    2/2012
(Continued)

OTHER PUBLICATIONS

International Search Report and Written Opinion dated Sep. 23, 2019 in corresponding International PCT Application No. PCT/EP2018/076585, 10 pages.
(Continued)

*Primary Examiner* — Roger L Pang
(74) *Attorney, Agent, or Firm* — Venable LLP; Jeffri A. Kaminski

(57) ABSTRACT

An axle system (150) for a vehicle comprises: —a differential unit (10) including a first housing (24) and a second housing (20) which rotationally receives at least part of said first housing; —at least one drive shaft (11) having one end configured to be connected to a wheel of the vehicle and one end connected to the differential unit (10) and rotationally received in the first housing (24), the drive shaft (11) including at least one joint (110) connecting two portions (114a, 114d) of the drive shaft (11) to transmit rotary motion between said portions; —a first bearing (30) secured around the drive shaft (11), placed between the drive shaft and the first housing (24), having an outer diameter (D30) smaller than the radial dimension (D) of the joint (110); —a second bearing (40) placed between the first housing (24) and the second housing (20); —at least one tightening member (50) to axially lock the first bearing outer ring (32) relative to the first housing (24). The tightening member comprises at least one manoeuvring portion (51) which is arranged in an offset
(Continued)

relation relative to the joint (110), when looking axially towards the differential unit (10), so that the tightening member manoeuvring portion (51) is visible and accessible, at least during a tightening phase of an axle system mounting process.

29 Claims, 7 Drawing Sheets

(51) Int. Cl.
*B60K 17/16* (2006.01)
*F16C 33/78* (2006.01)
*F16C 35/063* (2006.01)
*F16C 35/067* (2006.01)
*F16D 3/41* (2006.01)
*F16H 48/08* (2006.01)
*F16H 48/36* (2012.01)
*F16H 57/02* (2012.01)
*F16H 57/022* (2012.01)

(52) U.S. Cl.
CPC .......... *F16C 35/063* (2013.01); *F16C 35/067* (2013.01); *F16D 3/41* (2013.01); *F16H 48/08* (2013.01); *F16H 48/36* (2013.01); *F16H 48/40* (2013.01); *F16H 2048/082* (2013.01); *F16H 2048/364* (2013.01); *F16H 2048/405* (2013.01); *F16H 2057/02021* (2013.01); *F16H 2057/0221* (2013.01); *F16H 2057/0225* (2013.01)

(58) Field of Classification Search
CPC .......... F16H 48/06; F16H 2057/02021; F16H 2057/0221; F16H 2057/0225; B60K 17/165
USPC .......... 475/230, 221, 220; 29/893.1
See application file for complete search history.

(56) References Cited

U.S. PATENT DOCUMENTS

| | | | |
|---|---|---|---|
| 4,543,853 A | 10/1985 | von Hiddessen et al. | |
| 4,793,211 A | 12/1988 | Schmidt | |
| 5,567,060 A | 10/1996 | Steinberger et al. | |
| 7,582,037 B2 * | 9/2009 | Engelmann | B60K 17/165 |
| | | | 475/248 |
| 2004/0234185 A1 | 11/2004 | Wisotzky | |
| 2009/0082161 A1 | 3/2009 | Krude et al. | |
| 2013/0343691 A1 * | 12/2013 | Kwasniewski | F16C 19/547 |
| | | | 384/583 |
| 2018/0126783 A1 * | 5/2018 | Valente | B23K 20/12 |

FOREIGN PATENT DOCUMENTS

| | | |
|---|---|---|
| CN | 108274992 A | 7/2018 |
| DE | 2639150 A1 | 3/1978 |
| DE | 3642875 A1 | 7/1988 |
| DE | 9403308 U1 | 4/1994 |
| DE | 10103871 A1 | 8/2002 |
| DE | 10128073 A1 | 12/2002 |
| FR | 2927280 A1 | 8/2009 |
| KR | 20140095978 A | 8/2014 |
| WO | 2006074680 A1 | 7/2006 |

OTHER PUBLICATIONS

Chinese Office Action dated Jul. 11, 2023 in correspodning Chinese Patent Application No. 201880097423.6, 8 pages.

* cited by examiner

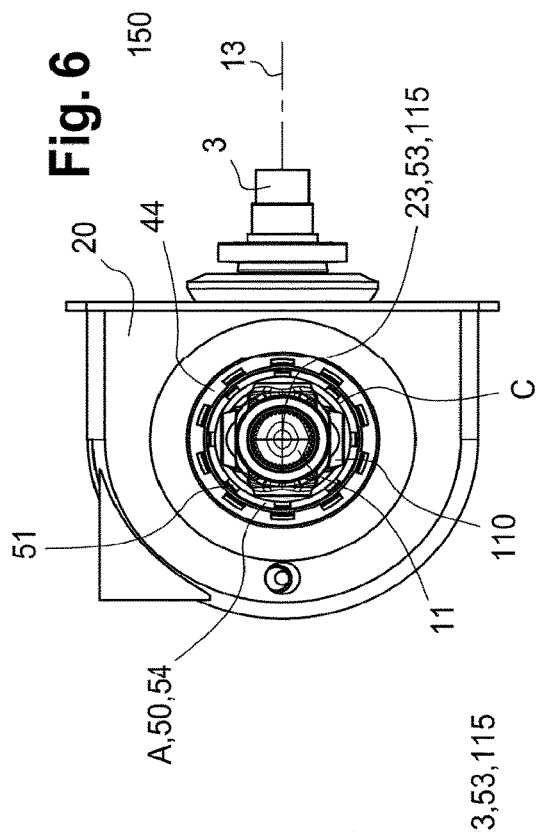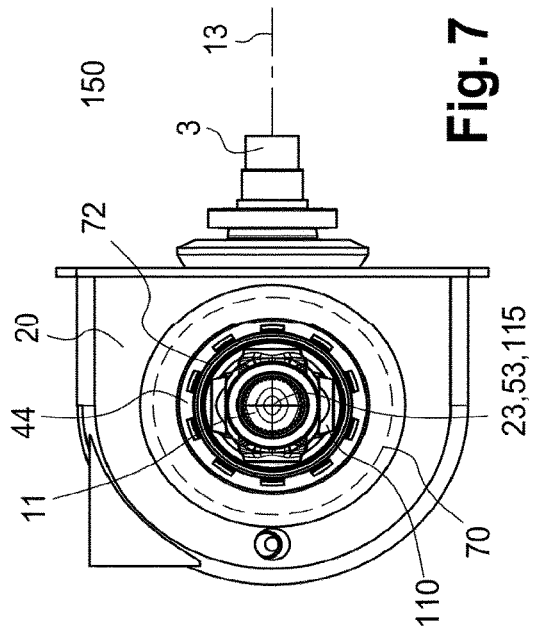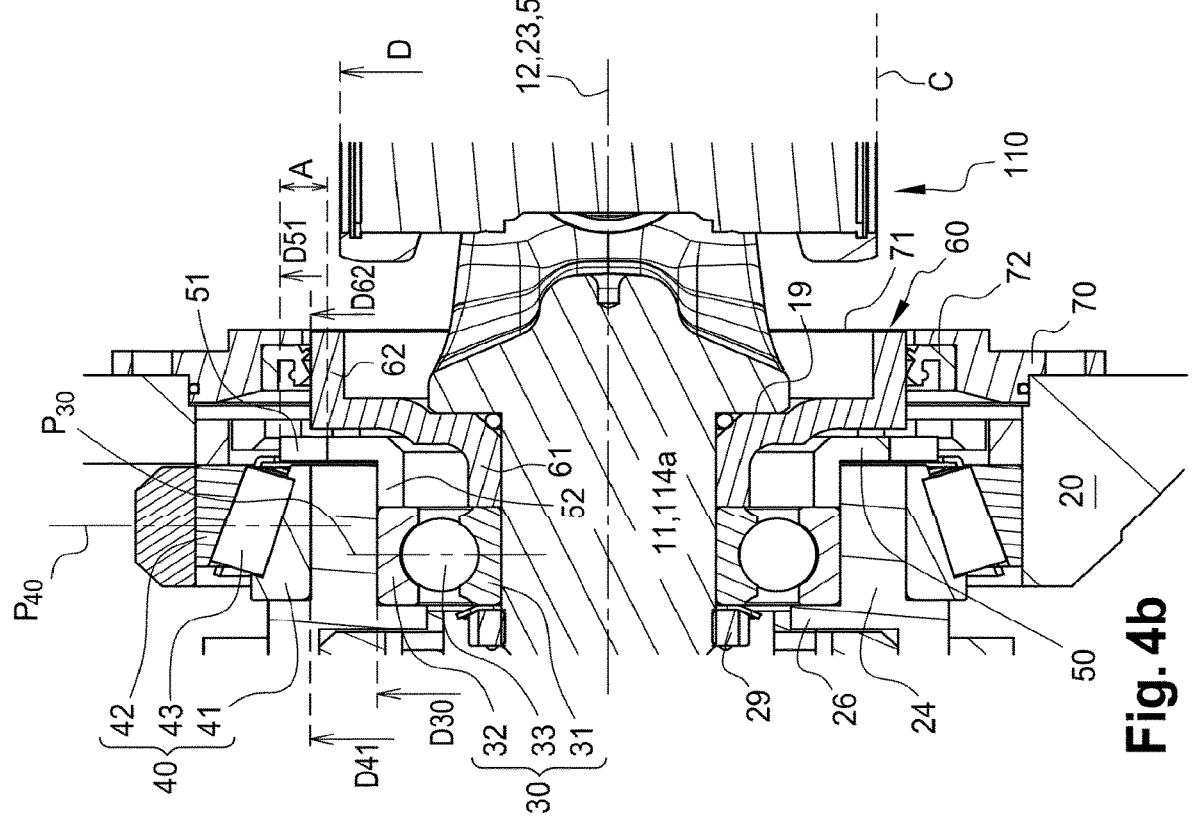

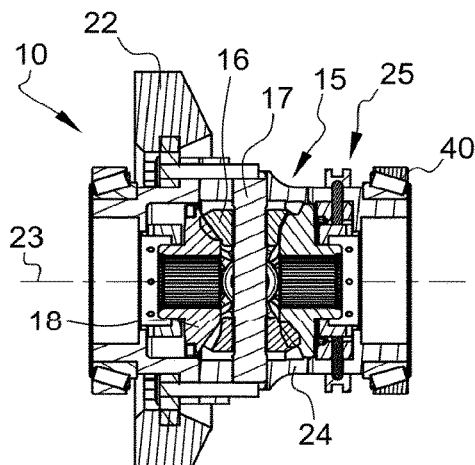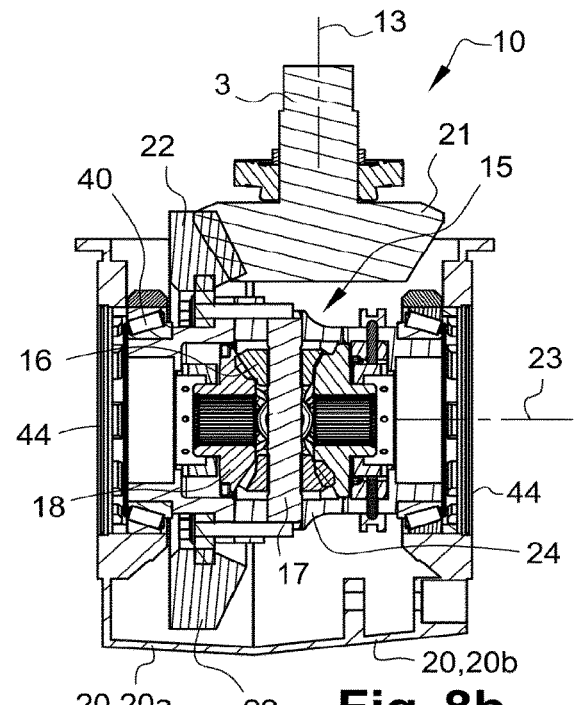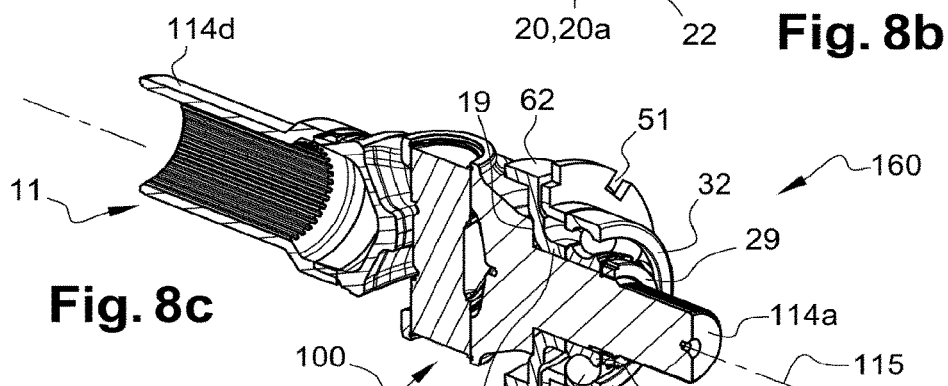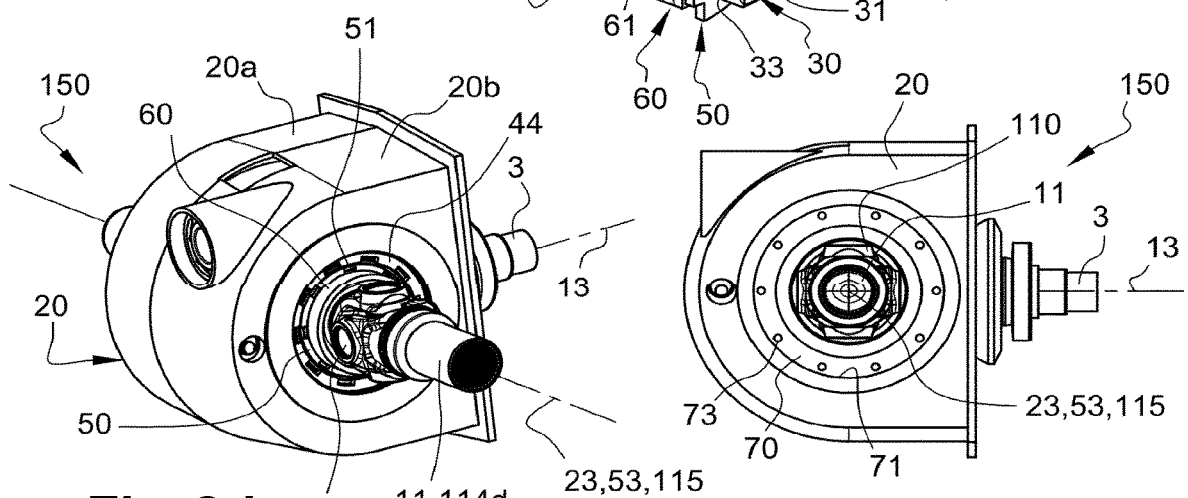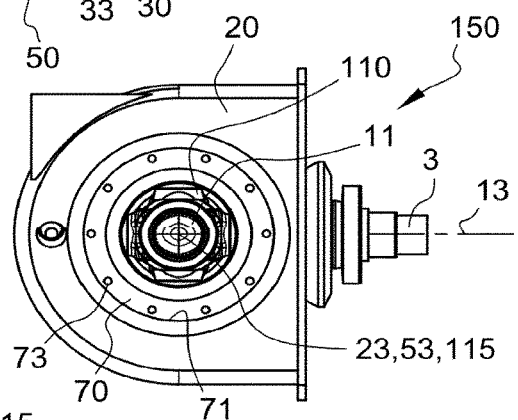

US 11,878,583 B2

AXLE SYSTEM FOR A VEHICLE AND MOUNTING PROCESS

CROSS-REFERENCE TO RELATED APPLICATIONS

This application is a U.S. National Stage application of PCT/EP2018/076585, filed Oct. 1, 2018, and published on Apr. 9, 2020, as WO 2020/069714 A1, all of which is hereby incorporated by reference in its entirety.

TECHNICAL FIELD

The invention relates to an axle system for a vehicle. The invention also relates to a drive shaft sub assembly for such an axle system, to a driven wheel system comprising such an axle system and to a vehicle comprising at least one such driven wheel system. The invention further relates to a process for mounting such an axle system.

BACKGROUND

A vehicle such as a truck is generally equipped with one or several differential units on its driven axles, to allow the left and right wheels of said axle to have different speeds when turning/manoeuvring.

As the transverse width of a vehicle, in particular a truck, is limited to a maximum value given by regulatory requirements, other vehicle components need to be fairly compact, which in particular applies to the powertrain system, especially the differential unit.

Such a space constraint is even more significant in some vehicle configurations:
  for electric vehicles, as they require significant space for batteries;
  for vehicles not comprising a mechanical differential, but implementing a torque vectoring solution. This creates packaging issues since the left and right wheels need to be independently driven, duplicating the transmission from the motor(s) to the wheel(s);
  for vehicles having an independent wheel suspension configuration, to which the invention more particularly applies.

A trend in transport industry, in particular in heavy duty transport industry, is to move from rigid axles to independent wheel suspension configurations, to improve several features (dynamic behavior, volume capacity for battery/fuel, wheel alignment, comfort, etc.). To get maximized battery/fuel efficiency from an independent wheel suspension driveline, wheel reduction (hub reduction) should be avoided. Without such a wheel reduction, the drive shafts have to be bigger. Moreover, these drive shafts must have a minimum length to support driveline torque and keep acceptable working angles, in order not to compromise the suspension stroke and consequently the comfort.

The width of vehicle being legally constrained, and a minimum length being needed for the drive shaft for torque and angle constraints, there is a need for an as much as possible compact differential unit in the vehicle transverse direction.

Other constraints derive from the independent wheel suspension configuration, such as the need for a stronger support of the drive shafts both in the differential unit area and in the wheel area, or the need to secure each drive shaft in translation, in both directions along the vehicle transverse direction and without play, in the differential unit, to avoid a greatly limit wear.

All these requirements have to be taken into account, bearing in mind that the mounting process of the whole vehicle driven wheel system must preferably not be significantly complicated nor take much longer. The same applies to maintenance operations.

SUMMARY

An object of the invention is to provide an improved axle system for a vehicle which solves at least one of the problems of the prior art.

In particular, the invention aims at improving compactness, and at making the mounting process and/or the maintenance operations easier.

To that end, and according to a first aspect, the invention concerns an axle system for a vehicle, having an axis and comprising:
  a differential unit including a first housing and a second housing which is at least partially arranged around the first housing and which rotationally receives at least part of said first housing;
  at least one drive shaft having one end configured to be connected to a wheel of the vehicle and one end connected to the differential unit and rotationally received in the first housing, the drive shaft including at least one joint connecting two portions of the drive shaft to transmit rotary motion between said portions, the joint having a radial dimension;
  a first bearing secured around the drive shaft, placed between the drive shaft and the first housing;
  a second bearing placed between the first housing and the second housing;
  wherein:
  the outer diameter of the first bearing is smaller than the radial dimension of the joint;
  and the axle system comprises at least one tightening member configured to axially lock the first bearing outer ring relative to the first housing, said tightening member comprising at least one manoeuvring portion which is arranged in an offset relation relative to the joint, when looking axially towards the differential unit, so that the tightening member manoeuvring portion is visible and accessible, at least during a tightening phase of an axle system mounting process.

Providing an axle system including a first bearing, in addition to the second bearing, makes it possible to better support and guide the drive shaft in rotation inside the differential. Owing to the invention, this advantage is not obtained to the detriment of compactness, as explained below.

Indeed, by providing a first bearing having a smaller outer diameter than the radial dimension of the joint, the invention greatly improves the compactness. As a result, the differential unit is more compact in the radial direction but also as a whole. Indeed, a small first bearing can more easily be housed in a limited space and, in some embodiments, can be appropriately and efficiently arranged relative to the surrounding components to further limit compactness, including in other directions than the radial direction. Besides, as the first bearing has a fairly small outer diameter, it does not require other components of the differential unit to be sized as large and/or resistant parts. Therefore, the overall size, weight and cost of the differential unit are reduced.

However, with such a configuration, due to its small outer diameter, the first bearing can be hidden by the joint or another component of the axle system, when looking axially towards the differential unit. As a consequence, the first bearing cannot be accessed nor easily axially blocked by conventional tightening means.

This is the reason why the invention further provides a specific tightening member having a specifically designed manoeuvring portion for allowing a user to easily and efficiently tighten said tightening member. In concrete terms, the terms "arranged in an offset relation relative to the joint" mean that the manoeuvring portion and the joint are not superimposed, or at least partially not superimposed, when looking axially towards the differential unit.

The tightening member is used to axially lock the first bearing outer ring relative to the first housing, i.e. to axially maintain the first bearing outer ring relative to the first housing, in both directions, without play. This prevents or greatly limits wear on the components due to high axial forces, in both directions and at high frequency.

The invention thus makes it possible to improve compactness without negative effects on the assembly and structure quality of the axle system nor on the ease of the mounting process.

"Axle system" has to be understood as the set of pieces that joins two wheels, and is not limited to a rigid axle. In the present invention, the axle system is not rigid as the drive shafts include joints. In practice, the axle system comprises two drive shafts, one on each side of the differential unit. The joint can be a universal joint, a homocinetic joint, a Rzeppa joint, or any other kind of joint capable of coupling connecting rigid rods whose axes are inclined to each other and to transmit rotary motion between said rigid rods.

"Differential unit" refers to a unit providing a differential effect, in order to allow the outer drive wheel to rotate faster than the inner drive wheel during a turn. Such a differential unit can include a mechanical differential. Alternatively, the differential effect can be achieved by the fact that the wheels are driven independently by a dedicated motor, preferably but not exclusively an electric motor, and corresponding transmission system, in a so-called torque vectoring technology.

In concrete terms, the radial dimension of the joint is the diameter of the smallest cylinder which has its centre on the axis, and which fully contains the joint, when the drive shaft is in a straight configuration (also called "enveloping cylinder"). The joint is not necessarily a rotationally symmetric piece; it can have at least a first radial dimension along one direction, and a second radial dimension different from the first radial dimension along another direction. The largest dimension among the first and the second radial dimensions is then the joint radial dimension.

In practice, the second housing can be an outer part that does not rotate relative to the vehicle chassis, while the first housing can be an inner rotating part relative to the vehicle chassis.

According to an embodiment, the first bearing outer diameter can be smaller than the second bearing inner diameter. Such a configuration allows reducing the space required in the radial direction.

In addition, advantageously, the first bearing and the second bearing may have median planes which are orthogonal to the axis and which are substantially coincident. In other words, with this configuration, the first bearing is arranged inside the second bearing. This further reduces the space required in the transverse direction. The term "coincident" includes a configuration in which the median planes are offset by less than 50% of the axial length of the first bearing, preferably less than 30%, more preferably less than 20%.

The first housing may comprise a radial wall, the tightening member being configured to axially tighten the first bearing outer ring against said radial wall. Said radial wall may be a piece distinct from the first housing but secured to the first housing. Said radial wall—which extends in a plane orthogonal to the axis—thus forms an axial abutment.

The tightening member manoeuvring portion can comprise at least one hole, recess or the like, configured to receive a tool capable of moving the tightening member axially relative to the first housing.

The tightening member can comprise several manoeuvring portions which are all arranged in an offset relation relative to the joint, and which are preferably arranged substantially on one and the same circle.

The axle system can comprise several tightening members, each tightening member comprising at least one manoeuvring portion which is arranged in an offset relation relative to the joint, the tightening members preferably being arranged substantially on one and the same circle.

The term "circle" is not limited to a line but includes an annular zone having a small radial dimension.

The axle system may further comprise a seal arranged between the drive shaft—or a part secured to the drive shaft—and the second housing—or a part secured to the second 35 housing, the seal preferably having an annular shape.

The axle system may further comprise a cover having an opening for receiving the drive shaft, the cover being configured to be removably mounted on and/or fastened to the second housing after the tightening phase of the axle system mounting process. In an embodiment, the cover may cover the manoeuvring portion. However, other implementations may be envisaged. The cover can have an annular shape, the opening being then centrally arranged in the cover.

The seal may be mounted in the cover opening. In an embodiment, the annular seal is mounted in the central opening of the annular cover.

In an implementation, the axle system comprises a left drive shaft connected to the differential unit and configured to be connected to at least one left wheel, and a right drive shaft connected to the differential unit and configured to be connected to at least one right wheel, the differential unit further comprising a differential which mechanically links the two drive shafts. At least one of the drive shafts is made to rotate:

by a crown wheel of the axle system which is connected to the differential and configured to be connected to an input shaft driven by a vehicle engine or by a vehicle electric motor;

or by at least one motor (electric motor, hydraulic motor, etc.), through a transmission system.

The differential may further comprise a blocking system for blocking the differential operation.

In another implementation, the differential effect is not achieved by means of a differential but through torque vectoring technology. Then, the axle system comprises a left drive shaft connected to the differential unit and configured to be connected to at least one left wheel, and a right drive shaft connected to the differential unit and configured to be connected to at least one right wheel. The differential unit further comprises at least one motor (electric motor, hydraulic motor, etc.) capable of rotating the left drive shaft through a transmission system, and at least one motor (electric motor, hydraulic motor, etc.) capable of rotating the right drive shaft through a transmission system, independently from the left drive shaft.

According to a first embodiment of the invention, the manoeuvring portion of the tightening 35 member is located in an area of the tightening member which is radially outside from the joint enveloping cylinder—i.e. the smallest cylinder which has its centre on the axis, and which fully contains the joint—when looking axially towards the differential unit. In other words, said area of the tightening member is radially outwardly offset from the joint. For example, said manoeuvring portion can be located in an annular area having a diameter that is larger than the radial dimension of the joint.

The manoeuvring portion of the tightening member can be located in a peripheral area of the tightening member.

For example, the tightening member can comprise a nut having:
- a tightening portion, such as a sleeve coaxial with the drive shaft, configured for abutting against the outer ring of the first bearing;
- and an outer annular flange comprising at least one notch which opens outwardly and which forms the manoeuvring portion.

The annular seal may have an inner diameter that is larger than the radial dimension of the joint. This disposition is advantageous in that the annular seal may be replaced when needed without disassembling the drive shaft. The maintenance is thus significantly improved.

The axle system may comprise a contact piece secured around the drive shaft and having:
- a blocking portion, such as a sleeve coaxial with the drive shaft, configured for abutting against the inner ring of the first bearing;
- a contact portion, such as a cylindrical contact portion coaxial with the drive shaft, with which the annular seal is radially in contact, wherein, preferably, the contact portion is radially inwardly offset relative to the tightening member manoeuvring portion.

By providing a contact portion which is radially inwardly offset relative to the tightening member manoeuvring portion, the invention ensures that access to the manoeuvring portion is not impeded by the contact piece. In other words, the contact piece can be mounted before the tightening phase. For example, there may be provided several manoeuvring portions arranged substantially on one and the same circle (or annular area) having a larger diameter than the contact portion.

In use, the contact portion of the contact piece can turn inside and against the annular seal; the annular seal and the annular cover can hide the tightening member manoeuvring portion.

According to a second embodiment of the invention, when looking axially towards the differential unit, the manoeuvring portion of the tightening member is located in an area at least partially included in the joint enveloping cylinder—i.e. the smallest cylinder which has its centre on the axis, and which fully contains the joint—and the manoeuvring portion of the tightening member is circumferentially offset from the joint or each portion of the joint. As the manoeuvring portion is located in an area at least partially included in the joint enveloping cylinder, it would not be accessible for being tightened if not circumferentially offset from the joint or each portion of the joint.

The tightening member can comprise at least one plate configured for abutting against the outer ring of the first bearing, the plate being preferably substantially flat, and preferably having a transverse dimension less than the inner diameter of the first bearing. The "transverse dimension" means the dimension in a transverse plane, i.e. a plane orthogonal to the axis. In concrete terms, the plate can be disc-shaped, its transverse dimension then being its diameter.

In other words, the plate is preferably a localized and separate piece. For example, the plate can be disc shaped. It can comprise at least one hole—for example two holes—for receiving a screw or another fastener. There may preferably be provided several distinct plates (for example four plates) regularly arranged around the axis.

The annular cover can comprise at least one aperture substantially axially facing the tightening member, so as to allow access to the manoeuvring portion. For example, the plate can have the same shape and dimensions that the aperture, so that it can be engaged through the aperture.

The annular seal may have an inner diameter that is smaller than the radial dimension of the joint. With such a configuration, the annular seal cannot be removed after the mounting process has been completed. However, a smaller seal is more energy efficient and accepts higher rotational speeds.

The drive shaft can comprise a stepped portion including a transverse face which forms an axial abutment for the first bearing, and a cylindrical face which forms a contact portion with which the annular seal is in contact, the diameter of the cylindrical face being equal or larger than the first bearing inner diameter. Preferably, the outer diameter of the annular seal is smaller than the first bearing outer diameter. The first bearing is thus hidden by the joint, the annular seal and the annular cover.

In use, the contact portion of the drive shaft stepped portion turns inside and against the annular seal.

According to a second aspect, the invention relates to a drive shaft sub assembly for an axle system as previously described, wherein the drive shaft has one end configured to be connected to a vehicle wheel and one end connected to a differential unit of the axle system, the drive shaft including at least one joint connecting two portions of the drive shaft to transmit rotary motion between said portions, the joint having a radial dimension.

According to an embodiment, the drive shaft sub assembly comprises:
- a first bearing having an inner ring secured around the drive shaft, the outer diameter of the first bearing being smaller than the radial dimension of the joint;
- a tightening member, such as a nut, having a tightening portion which is configured for abutting against the outer ring of the first bearing and a manoeuvring portion which is radially outwardly offset from the joint, when looking axially towards the differential unit;
- and a contact piece secured around the drive shaft, having a blocking portion which is configured for abutting against the inner ring of the first bearing, and a contact portion for an annular seal, said contact portion being cylindrical, radially inwardly offset relative to the tightening member manoeuvring portion, and preferably having a diameter larger than the radial dimension of the joint.

Both the tightening member and the contact piece can be located between the first bearing and the joint; a nut can be provided on the side of the ring that is opposite the contact piece, in the axial direction.

According to another embodiment, the drive shaft sub assembly comprises:
- a first bearing having an inner ring secured around the drive shaft, the outer diameter of the first bearing being smaller than the radial dimension of the joint;

an annular cover having a central opening in which the drive shaft is received, an annular seal being mounted between the drive shaft and said central opening, the annular cover being located between the first bearing and the joint and comprising at least one aperture which, when looking axially towards the differential unit, is located in an area at least partially included in the joint enveloping cylinder—i.e. the smallest cylinder which has its centre on the axis, and which fully contains the joint—and can be placed in a circumferentially offset position from the joint or each portion of the joint, the aperture being configured to allow a tightening member to be inserted through it until it abuts against the outer ring of the first bearing.

According to a third aspect, the invention concerns a driven wheel system for a vehicle, comprising an axle system as previously described, at least one left wheel and at least one right wheel, the axle system comprising a left drive shaft connected to the differential unit and to the left wheel(s), and a right drive shaft connected to the differential unit and to the right wheel(s), each wheel being further connected to the differential unit by at least one lower arm articulated at both ends and preferably at least one upper arm articulated at both ends.

According to a fourth aspect, the invention concerns a vehicle comprising at least one driven wheel system as previously described.

According to a fifth aspect, the invention relates to a process for mounting an axle system as previously described, the process comprising the following steps:
a) providing a differential unit with a second bearing placed between the first housing and the second housing;
b) providing a drive shaft sub-assembly comprising a drive shaft including at least one joint connecting two portions of the drive shaft to transmit rotary motion between said portions, the joint having a radial dimension, the drive shaft sub-assembly further comprising a first bearing having an inner ring secured around the drive shaft, the outer diameter of the first bearing being smaller than the radial dimension of the joint;
c) providing a tightening member;
d) after steps a), b) and c), engaging the drive shaft sub-assembly in the first housing so that the first bearing is placed between the drive shaft and the first housing, and connecting the drive shaft to the differential unit;
e) after step d), tightening the tightening member in order to axially lock the first bearing outer ring relative to the first housing in the mounted position.

Owing to the invention, the drive shaft can be mounted at a late step of the mounting process, which makes said process significantly easier. Indeed, the number of subsequent mounting steps to be performed with the drive shaft already assembled, i.e. to be performed with a heavy and cumbersome system, are limited. The invention thus meets the strong demand to have the drive shaft kept as pre-assembled units (as these drive shafts need to be dynamically equilibrated) without significant negative impact on the mounting process.

According to an embodiment, in step c), the tightening member is provided as a piece mounted on the drive shaft, before the drive shaft sub-assembly is engaged in the first housing.

According to another embodiment, in step c), the tightening member is provided as a separate piece, and in that the tightening member is assembled to the axle system once the drive shaft sub-assembly has been engaged in the first housing. By "separate piece" is meant that the tightening member is not fastened to another piece (of the differential unit or of the drive shaft sub-assembly).

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4b is a detailed enlarged view of FIG. 4a;

FIG. 5 is a perspective, partially cut out, view of a tightening member of the axle system of FIG. 4a;

FIG. 6 is a side view of the axle system of FIG. 4a without seal nor cover;

FIG. 7 is a side view of the axle system of FIG. 4a with the annular seal and the annular cover, the annular cover being transparent and represented by a dotted line;

FIGS. 8a to 8e show various successive steps of the mounting process of the axle system of FIG. 4a;

DETAILED DESCRIPTION OF EXAMPLE EMBODIMENTS OF THE INVENTION

The invention can be applied in heavy-duty vehicles, such as trucks, buses and construction equipment, as well as medium-duty vehicles.

Figure 1:
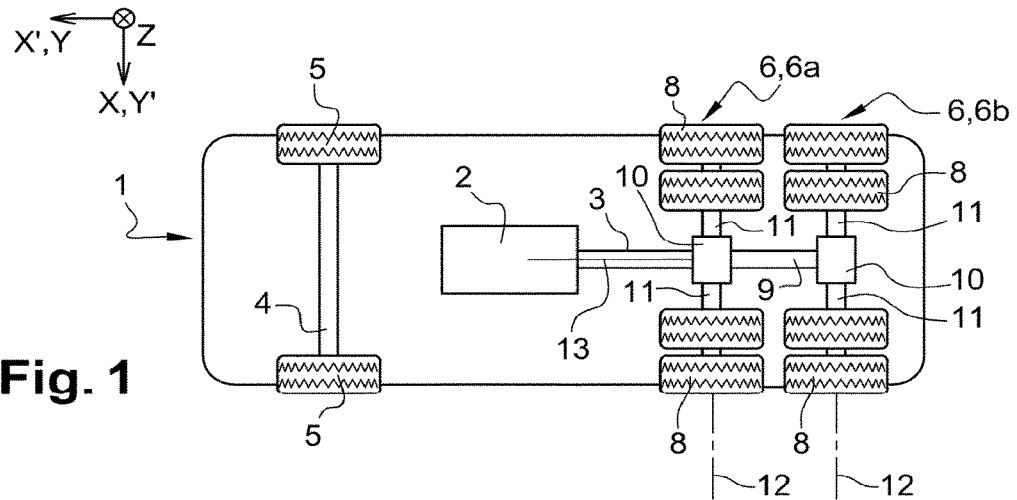
FIG. 1 is a schematic drawing of an underside of a vehicle showing a driven wheel system including a differential unit according to an embodiment of the invention.

As shown in FIG. 1, a vehicle 1 comprises at least one driven wheel system 6. In the illustrated embodiment, the vehicle 1 comprises a first driven rear wheel system 6a and a second driven rear wheel system 6b located rearwards from the first driven rear wheel system 6a. The vehicle 1 further includes a front axle 4 connected to front wheels 5.

Although the invention is described for a rear driven wheel system, it can be used in another driven wheel system, especially in a front driven wheel system.

The or each driven wheel system 6 has an axis 12, and comprises a differential unit 10, i.e. a unit providing a differential effect, in order to allow the outer drive wheel to rotate faster than the inner drive wheel during a turn.

The driven wheel system 6 further comprises two drive shafts 11, namely a left drive shaft connected to the differential unit 10 and to at least one left wheel 8, and a right drive shaft connected to the differential unit 10 and to at least one right wheel 8. Each rear wheel system 6a, 6b can comprise two wheels 8 on either side, thus forming a dual mounted tires arrangement. However, this should not be considered as limitative.

In the embodiment illustrated in FIG. 1, the vehicle 1 comprises an engine 2 that drives an input shaft 3 having an axis 13. The differential unit 10 includes a differential 15 which is driven by the input shaft 3 and which transmits the appropriate torque to the left and right drive shafts 11. An additional shaft 9 connects the input shaft 3 to the differential unit 10 of the second driven rear wheel system 6b, through the differential unit 10 of the first driven rear wheel system 6a, and is the input shaft for the differential unit 10 of the second driven rear wheel system 6b.

Alternatively, as will be described with reference to FIG. 9, the invention can be applied to an electric vehicle. Such a vehicle does not include an engine 2 nor the corresponding driveline, but rather at least one electric motor. Either one motor (or more) is used to drive a corresponding drive shaft 11, the drive shafts thus being independently driven by one or more dedicated motors, with the appropriate torque (see FIG. 9); or one motor (or more) is used to drive a mechanical differential rotating the drive shafts 11 with the appropriate torques (variant not illustrated).

Figure 2:
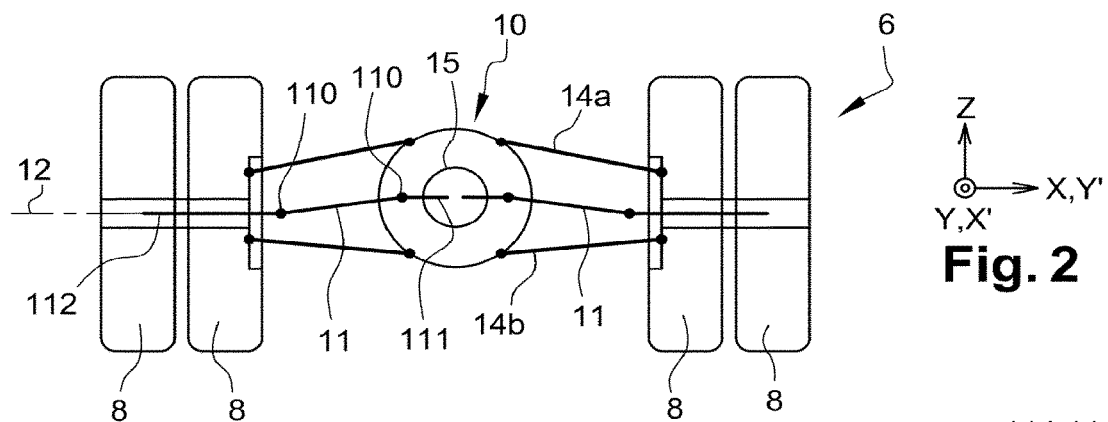
FIG. 2 is a schematic view of an embodiment of a driven wheel system.

The invention concerns a vehicle 1 having an independent wheel configuration, as schematically illustrated in FIG. 2. In such a configuration, the left wheel(s) 8 and the right wheel(s) 8 are each connected to the differential unit 10 by means of the corresponding driveshaft 11, at least one joint 110 (such as a universal i.e. a cardan joint, or another kind of joint), at least one lower arm 14b articulated at both ends, and preferably at least one upper arm 14a articulated at both ends. Although in FIG. 2 the differential unit 10 is shown as including a differential 15, other implementations are possible.

Figure 3:
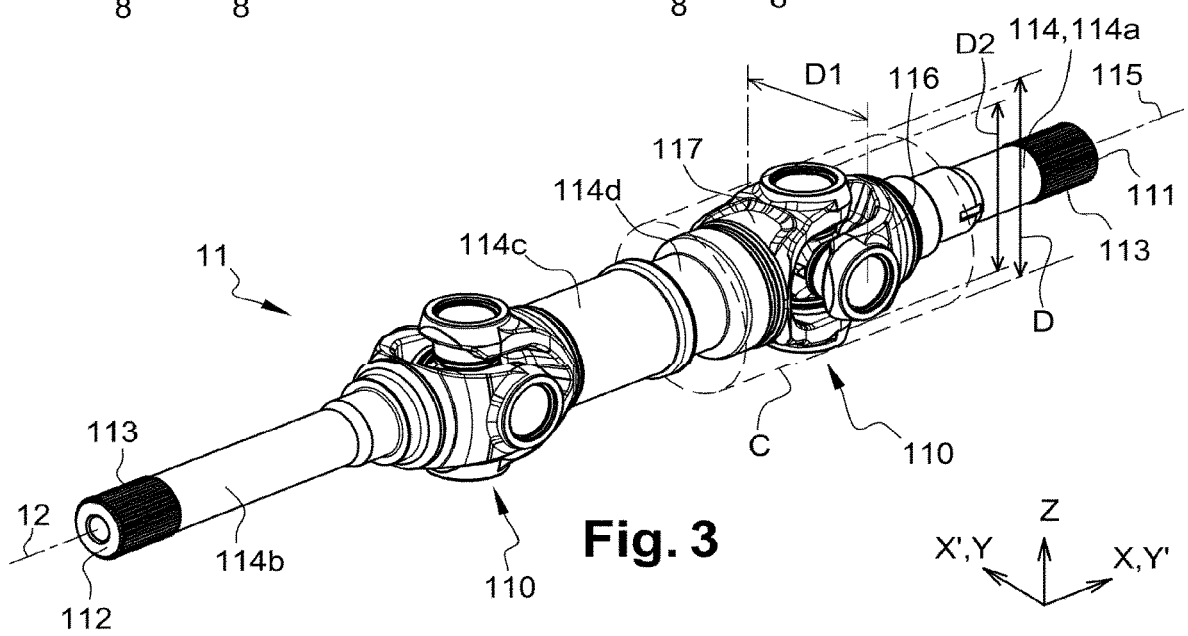
FIG. 3 is a perspective view of one drive shaft pertaining to the driven wheel system of FIG. 2.

As shown in FIG. 3, the drive shaft 11 comprises a first end 111 configured to be connected to the differential unit 10 and a second end 112 configured to be connected to a wheel 8 of the vehicle 1. The first end 111 and the second end 112 may be provided with splines 113 or another system providing a rotationally blocked connection with the differential unit 10/the wheel 8.

The drive shaft 11 is made of several rigid portions 114. In the embodiment illustrated in FIG. 3, there are provided a first portion 114a configured to be connected to the differential unit 10, a second portion 114b configured to be connected to a wheel 8, and two intermediate portions 114c, 114d, which are movable the one into the other along axis 12 to form a telescopic intermediate piece, in order to adjust the drive shaft length to the suspension stroke. The first portion 114a has an axis 115.

As can be seen in FIGS. 1 to 3, the longitudinal direction X is defined as a direction parallel to the axis 12 of a driven wheel system 6, which joins the wheels 8 when the drive shaft 11 is in a straight configuration as illustrated in FIG. 3. In the operating position, i.e. when the differential unit is mounted under the vehicle 1, as shown in FIG. 1, the longitudinal direction X corresponds the transverse direction Y' of the vehicle 1. Direction X is substantially horizontal when the vehicle 1 is on a horizontal surface.

Besides, the transverse direction Y is defined as the direction which is orthogonal to the longitudinal direction X and substantially horizontal when the vehicle 1 is on a horizontal surface. Direction Y corresponds the longitudinal direction X' of the vehicle 1. The axis 13 of the input shaft 3 is roughly parallel to the transverse direction Y, i.e the longitudinal direction X' of the vehicle 1, or inclined relative to the transverse direction Y, horizontally and/or vertically, by preferably less than 5°.

Moreover, direction Z is defined as the vertical direction—when the vehicle 1 is on a horizontal surface.

The invention will be described when the vehicle 1 is on a horizontal surface.

Portion 114a and portion 114d, on the one hand, and portion 114b and portion 114c, on the other hand, are connected by a joint 110. In the embodiment illustrated in the figures, each 35 joint 110 is a universal joint. However, this should not be considered as limitative; any other type of joint which is configured for transmitting rotary motion between said adjacent portions 114 could be implemented.

The joint 110 has a radial dimension D, which is defined as the largest dimension of the joint 110 in a plane (Y,Z). In other word, the radial dimension is the diameter of the smallest cylinder C (called "enveloping cylinder") which has its centre on the axis 12, and which fully contains the joint 110, when the drive shaft has a straight configuration.

For example, with a universal joint as illustrated in FIG. 3, the joint 110 comprises two U-shaped pieces 116, 117 each having a median plane, the median planes being orthogonal the one relative to the other. One U-shaped piece 116 has a radial length D1, i.e. the radial length between the ends of the U; the other U-shaped piece 117 has a radial length D2 which is larger than D1. In this embodiment, the radial dimension D of the joint 110 is defined along a direction which is inclined relative to the directions along which D1 and D2 are defined; D is a bit higher than D2.

Figure 4A:
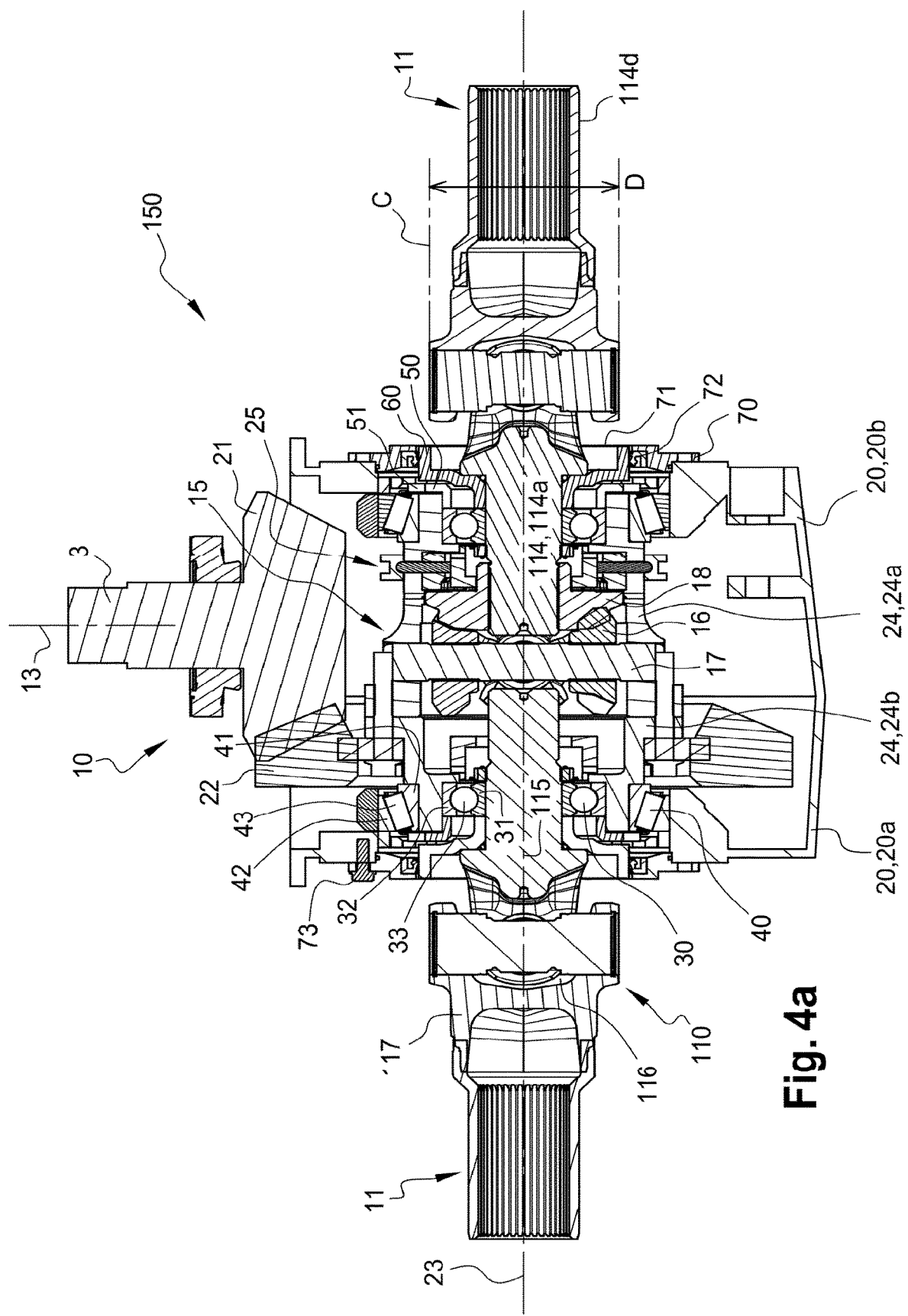
FIG. 4a is a partial and cross section view of an axle system according to a first embodiment of the invention, including a tightening member, an annular seal and an annular cover, as well as a mechanical differential.

Reference is now made to FIGS. 4a to 9 which show a first embodiment of the invention. FIG. 4a more specifically illustrates an axle system 150 including a differential unit 10 and one drive shaft 11 on both sides of the differential unit 10.

One variant of this first embodiment is illustrated in FIGS. 4a to 8e.

The differential unit 10 comprises a differential carrier housing 20, which can made of a first housing portion 20a and a second housing portion 20b (also shown in FIG. 8d) secured to one another by means of appropriate fasteners (not shown). In another implementation, the differential carrier housing 20 can made of a single piece.

The differential unit can comprise a differential 15—i.e. a mechanical differential.

30 Inside the differential carrier housing 20 can be located a crown wheel 22 having a longitudinal axis 23. The crown wheel 22 is driven in rotation around said longitudinal axis 23 by the input shaft 3, by engagement of teeth arranged on a pinion 21 mounted on said input shaft 3 and teeth arranged on the crown wheel 22.

Inside the crown wheel 22 is arranged the differential 15 which comprises differential side pinions 16, for example four differential side pinions, which are fitted on a joint cross 17 attached to the crown wheel 22, and two differential side gears 18. Each differential side gear 18 meshes with at least one differential side pinion 16 and is fastened to the first end 111 of one of the drive shafts 11, i.e. to the first end 111 of the portion 114a of the drive shaft 111. In the mounted position, the axis 115 of said portion 114a and the axis 23 of the crown wheel 22 are coincident.

The differential unit 10 further comprises, inside the differential carrier housing 20, a differential housing arrangement 24 which contains the differential 15 and part of the drive shafts 11, more specifically part of the portion 114a of each drive shaft 11. The differential housing arrangement 24 is secured to the crown wheel 22. It may be made of two parts, namely two differential housings 24a, 24b each forming a sleeve around the corresponding differential side gears 18 and partly around the drive shaft 11. Said differential housings 24a, 24b may be fastened on both sides of the joint cross 17; other implementations may however be envisaged.

Thus, on each side of the joint cross 17, the differential side gear 18 is mounted at the first end 111 of the drive shaft 11 in a rotationally fixed manner, for example by means of the splines 113. Furthermore, both the differential side gear 18 and the drive shaft 11 are rotatably mounted relative to the differential housing 24a, 24b around the longitudinal axis 23. The crown wheel 22, differential 15, and differential housing 24 are rotating parts inside and with respect to the differential carrier housing 20.

In this application, the differential housing 24 is also referred to as "first housing 24", while the differential carrier housing 20 is also referred to as "second housing 20".

The differential unit 10 may further comprise a blocking system 25 for blocking the differential unit operation, when required.

It has to be noted that, according to an alternative implementation of FIG. 4a, not show, the first housing 24 and joint cross 17 could be made to rotate not by a crown wheel driven by the engine 2, but by an motor (electric motor, hydraulic motor, etc.). In such a configuration of the vehicle 1, the motor output shaft may be mechanically connected to the first housing 24 and joint cross 17 by means of a transmission system preferably including a gear system.

The way one drive shaft 11, more precisely the portion 114a of the drive shaft 11, is arranged in the differential unit 10 will now be described, bearing in mind that the left and right arrangements are structurally identical, while their respective dimensions may be different.

The axle system 150 comprises a first bearing 30 which is secured around the drive shaft 11, and placed between the drive shaft 11 and the first housing 24. The drive shaft 11 is thus rotationally received in the first housing 24. The first bearing 30 includes an inner ring 31 and an outer ring 32, as well as rolling elements 33 which may be balls.

The first bearing inner ring 31 is rotationally fastened to the drive shaft 11 and further axially fastened to the drive shaft 11. To that end, the first bearing inner ring 31 may be pushed against a shoulder 19 of the drive shaft 11—forming a radial abutment—by means of an appropriate element such as nut 29. The first bearing inner ring 31 may be in contact with the shoulder 19 (see for example FIG. 12d), or an intermediate piece may be provided between the inner ring 31 and the shoulder 19 (see for example FIG. 4b).

The axle system 150 also comprises a second bearing 40 which is placed between the first housing 24 and the second housing 20. The second bearing 40 includes an inner ring 41 and an outer ring 42, as well as rolling elements 43 which may be tapered rollers.

In a particularly compact non limitative embodiment, the outer diameter D30 of the first bearing 30 is smaller than the inner diameter D41 of the second bearing 40. Furthermore, the first bearing 30 and the second bearing 40 may have median planes P30, P40, respectively, which are orthogonal to the axis 23 and which are substantially coincident. Thus, the first bearing 30 and the second bearing 40 can be arranged coaxially the one inside the other. This significantly improves compactness, specifically in the longitudinal direction X (i.e. the transverse direction Y' of the vehicle 1).

According to the invention, the outer diameter D30 of the first bearing 30 is smaller than the radial dimension D of the joint 110. Having a small bearing is advantageous, especially in terms of compactness, but the consequence is that access to the first bearing 30 is complicated, or even impossible, when the drive shaft 11 is mounted in the first housing 24. As the first bearing 30 is generally secured around the drive shaft 11 before the drive shaft 11 is inserted inside the first housing 24, then the first bearing 30 is necessarily hidden, or hard to access, when it is located in the first housing 24. However, the first bearing 30 has to be maintained axially, without mechanical play, for an efficient and robust implementation of the axle system 150.

To solve this problem, there axle system 150 comprises at least one tightening member 50 configured to axially lock the first bearing outer ring 32 relative to the first housing 24. Furthermore, said tightening member 50 comprises at least one manoeuvring portion 51 which is arranged in an offset relation relative to the joint 110, when looking axially towards the differential unit 10. As a consequence, the tightening member manoeuvring portion 51 is visible and accessible despite the joint 110, at least during a tightening phase of the mounting process of the axle system 150.

For example, the tightening member 50 can be configured to axially tighten the first bearing outer ring 32 against a radial wall 26 of the first housing 24. In practice, the first housing 24 can form substantially a sleeve around axis 23, provided with an inwardly projecting rib forming said radial wall 26.

Figure 5:
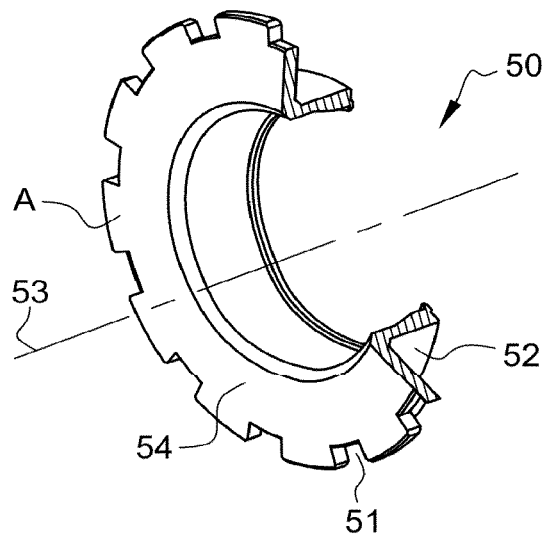

In the embodiment shown in FIG. 4a, the tightening member 50 comprises a nut. As best seen in FIG. 5, the tightening member 50 has an axis 53. It comprises a tightening portion 52, which may be formed as a sleeve coaxial with the drive shaft 11 in use and which is configured for abutting against the outer ring 32 of the first bearing 30. The tightening portion 52 may have an outer thread (not shown) for cooperating with an inner thread of the first housing 24. The tightening member 50 also comprises an outer annular flange 54. The flange 54 comprises at least one notch 51 which opens outwardly and which forms one manoeuvring portion. Preferably, the flange 54 comprises several notches 51 regularly circumferentially spaced, forming a crenulated peripheral area A. Alternatively, the notch or notches 51 could open axially.

As shown in FIG. 4b, the peripheral area A including the notches 51 has at least an outer diameter D51 that is larger than the radial dimension D of the joint 110, and preferably also an inner diameter that is larger than the radial dimension D of the joint 110.

Thus, the notches 51—i.e. the manoeuvring portions of the tightening member 50—are located in an area A of the tightening member 50 which is radially outwardly offset from the joint 110, when looking axially towards the differential unit 10, or at least partially radially outwardly offset. The notches 51 can therefore receive a tool capable of moving the tightening member 50 axially relative to the first housing 24.

The axle system may comprise a contact piece 60 secured around the drive shaft 11. Said contact piece 60 forms an intermediate piece between the inner ring 31 and the shoulder 19 as previously described.

The contact piece 60 has a blocking portion 61 which may be formed as a sleeve coaxial with the drive shaft 11, and which is configured for abutting against the inner ring 31 of the first bearing 30. The first bearing inner ring 31 is therefore tightened between the contact piece blocking portion 61 and the nut 29.

The contact piece 60 also has a contact portion 62 such as a cylindrical contact portion coaxial with the drive shaft 11. The contact portion 62 is arranged not to hide, or not to fully hide, the manoeuvring portion(s) 51, when looking axially towards the differential unit 10, in order to allow access to said manoeuvring portion(s) 51, for tightening the first bearing outer ring 32 against the first housing 24. For that purpose, the contact portion 62 preferably has an outer diameter D62 that is less than the outer diameter D51 of the tightening member peripheral area A. The contact portion 62 can be fully radially inwardly offset relative to the tightening member manoeuvring portion 51, or only partially offset, i.e. partly facing the peripheral area A along the longitudinal direction X, as shown in FIG. 4b.

In the mounted position, the axle system 150 also comprises an annular cover 70 having a central opening 71 for receiving the drive shaft 11. The annular cover 70 is removably fastened to the second housing 20 by means of appropriate fasteners 73 (see FIGS. 4a and 8e).

An annular seal 72 is mounted in the central opening 71 of the annular cover 70 and is in contact with the contact portion 62 of the contact piece 60. In other words, the annular seal 72 is arranged between the contact piece 60—secured to the drive shaft 11—and the annular cover 70—secured to the second housing 20. In this embodiment, the annular seal 72 can have an inner diameter (i.e. where the contact with the opposite piece occurs) that is larger than the radial dimension D of the joint 110 (in other words, D62>D). This makes it possible to change the annular seal 72 when needed, for maintenance operations during the service life of the axle system 150, without requiring the drive shaft 11 to be removed from the differential unit 10. This also avoids damaging the annular seal 72 when the drive shaft 11 is mounted.

A mounting process of the axle system will now be described, with reference to FIGS. 8a to 8e.

As shown in FIG. 8a, the differential unit 10 is prepared, with the differential 15, the first housing 24, the second bearings 40 (on either side of the joint cross 17), and possibly the blocking system 25. Then, as shown in FIG. 8b, the assembly of FIG. 8a is inserted in the second housing 20. Differential nuts 44 are tightened to set the bevel set backlash and the preload of the second bearings 40.

Two drive shaft sub-assemblies 160 are also prepared.

A shown in FIG. 8c, one drive shaft sub-assembly 160 comprises a drive shaft 11 including at least one joint 110 between the first portion 114a configured to be connected to the differential unit 10 and an intermediate portion 114d. The drive shaft sub-assembly 160 also includes:

the contact piece 60 secured around the drive shaft 11, more specifically around the drive shaft first portion 114a;

the first bearing 30, with its inner ring 31 secured around the drive shaft 11 and axially tightened by the nut 29 against the contact piece blocking portion 61 which itself is abutting against the shoulder 19 of the drive shaft 11;

the tightening member 50, mounted on the drive shaft 11 and axially located between the first bearing outer ring 32 and the contact piece 60. Advantageously, there may be provided a member for preventing a radial movement of the tightening member 50 as long as the assembling process has not been completed. This member can be a centring collar (not shown) protruding from the contact piece 60 towards the first bearing 30 and configured to be in contact with the inner face of the tightening portion 52 of the tightening member 50.

Then the annular seal 72 is mounted in the central opening 71 of the annular cover 70, for both covers 70. This step is not illustrated.

The drive shaft sub-assembly 160 is then engaged in the assembly illustrated in FIG. 8b, in the first housing 24, in order to connect the drive shaft 11 to the differential unit 10, i.e. to insert the end of the drive shaft first portion 114a into the corresponding differential side gear 18 and to rotationally link the first portion 114a and the differential side gear 18. The first bearing 30 is thus placed between the drive shaft 11 and the first housing 24, as illustrated in FIG. 4a.

At this stage of the mounting process, the axle system 150 is as illustrated in FIGS. 6 and 8d. It can be seen that the first bearing 30 is not visible, because of its small diameter D30. On the contrary, the tightening member 50 is not fully hidden, as its manoeuvring portion(s) 51 are radially located outward from the contact piece 60 and the joint 110, and inward from the differential nut 44. The manoeuvring portion(s) 51 being visible and accessible by an operator, the tightening member 50 can thus be operated, during a tightening phase of the axle system mounting process. In practice, a tool can be introduced in the notches 51 in order to rigidly secure (i.e. without play) the first bearing outer ring 32 relative to the first housing 24.

The tightening member 50 is thus a partly external piece—at least during the tightening phase—which makes it possible to ensure tightening while the drive shaft 11 has already been mounted.

Once the first bearing 30 has been properly axially locked, the annular cover 70 equipped with the annular seal 72 can be mounted, by being engaged around the drive shaft 11 (on both sides of the second housing 20). In the mounted position, illustrated in FIGS. 8e, 7 4a and 4b, the annular seal 72 is in contact with the outer face of the contact piece contact portion 62, and the annular cover 70 is fastened to the second housing 20 by the fasteners 73.

In FIG. 7, the annular cover 70 is represented as a transparent piece, only its edge being illustrated with a dotted line. It can thus be seen that the tightening member manoeuvring portions 51 are not visible any more, as they are hidden by the annular seal 72, when looking axially towards the differential unit 10.

The annular cover 70 may comprise at least one pin (not shown) protruding axially towards the differential 15 and configured to engage the differential nut 44, preferably the inner part thereof, to prevent rotation i.e. untightening of said differential nut 44.

Figure 9:
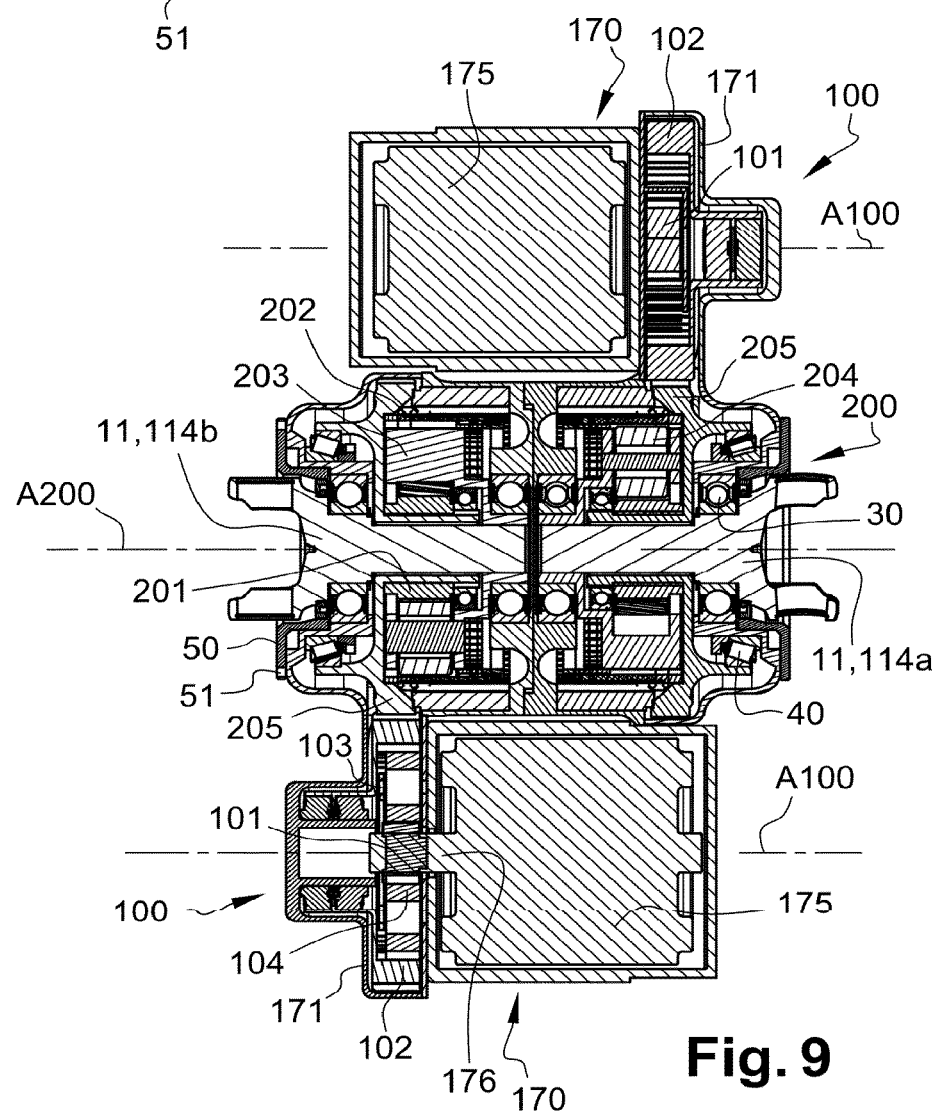
FIG. 9 is a partial and cross section view of an axle system according to a variant of the first embodiment, including at least one motor to drive each one of the two drive shafts, to achieve a differential effect through torque vectoring technology.

A variant of the first embodiment is illustrated in FIG. 9.

In this variant, there is not provided a mechanical differential. Rather, the differential effect is achieved by the fact that the wheels are driven independently by a dedicated motor and corresponding transmission system, in a so-called torque vectoring technology. In FIG. 9, the motor is electric, however, other kinds of motors could be envisaged, such as a hydraulic motor.

The driven wheel system 6 comprises one powertrain module 170 for rotating one drive shaft 11 and another powertrain module 170 for rotating the other drive shaft 11. One powertrain module 170 comprises a casing 171 and a powertrain system which is configured to drive the drive shaft 11, and which comprises:

at least one motor 175 having an output shaft 176;
a transmission system between the motor 175 and the drive shaft 11, which is housed in the casing 171.

In an embodiment, the transmission system may comprise a first epicyclic gear train 100 having a first axis A100, and a second epicyclic gear train 200 having a second axis A200 which is parallel to the first axis A100. In the operating position, i.e. when the powertrain module 170 is mounted on the vehicle 1, the axes A100 and A200 are parallel to direction Y'. In a variant, the first epicyclic gear train 100 may be omitted and replaced by a more conventional parallel gear train reduction arrangement.

The first epicyclic gear train 100 can comprise:
- a sun 101 connected to the motor output shaft 176 and arranged as an inner component of the first epicyclic gear train 100;
- a ring 102 arranged as an outer component of the first epicyclic gear train 100;
- a planet carrier 103 fixedly secured to the casing 171, or made as a single piece with the casing 171;
- planet gears 104 (for example four planet gears) arranged between the sun 101 and the ring 102. The planet gears 104 are rotationally mounted on the planet carrier 103.

The second epicyclic gear train 200 can comprise:
- a sun 201 fixedly secured to a hub 205 that meshes with the ring 102 of first epicyclic gear train 100. The sun 201 is arranged as an inner component of the second epicyclic gear train 200;
- a ring 202 arranged as an outer component of the second epicyclic gear train 200;
- a planet carrier 203 which rotates the drive shaft 11;
- planet gears 204 (for example four planet gears) arranged between the sun 201 and the ring 202. The planet gears 204 are rotationally mounted on the planet carrier 203.

A first bearing 30 is mounted between the drive shaft 11 and the casing 171, while a second bearing 40 is mounted between the casing 171 and the hub 205. A tightening member 50 having an accessible manoeuvring portion 51, at least during a tightening phase of the mounting process, is provided to axially lock the first bearing outer ring 32 relative to the casing 171.

Reference is now made to FIGS. 10 to 12d which show a second embodiment of the invention.

The axle system 150 may be devoid of a contact piece 60 as previously described. Rather, the drive shaft 11—more specifically the first portion 114a—may comprise a stepped portion including a transverse face or shoulder 19 which forms an axial abutment for the first bearing 30 and a cylindrical face which forms a contact portion 63 with which the annular seal 72 is in contact in use.

The diameter of the cylindrical face 63 can be less than the radial dimension D of the joint 110, which means that the annular seal 72 has an inner diameter that is smaller than the radial dimension D of the joint 110. Besides, the diameter of the cylindrical face 63 is preferably larger than the first bearing inner diameter.

The mounting process of the axle system will now be described.

Figure 10:
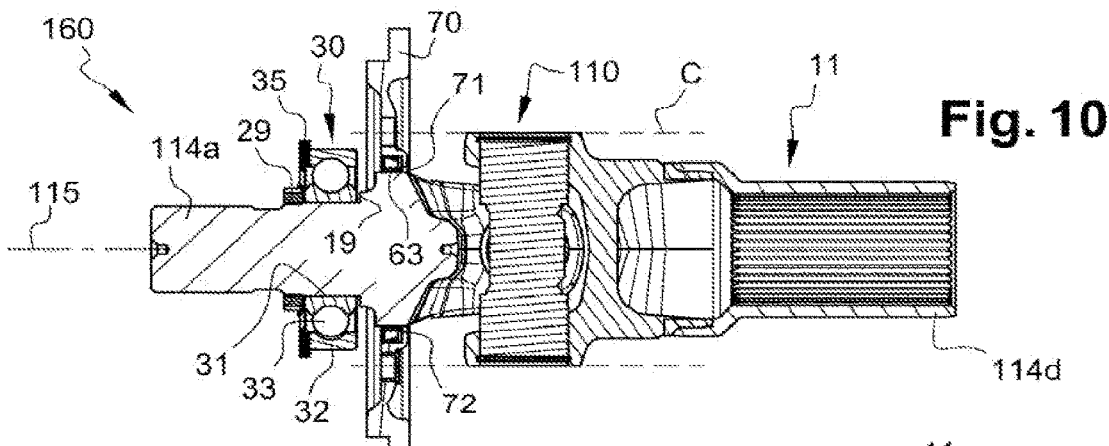
FIG. 10 is a cross section view of a drive shaft sub assembly according to a second embodiment of the invention.

35 Two drive shaft sub-assemblies 160 are prepared as shown in FIG. 10.

One drive shaft sub-assembly 160 comprises a drive shaft 11 including at least one joint 110 between the first portion 114a configured to be connected to the differential unit 10 and an intermediate portion 114d. The drive shaft sub-assembly 160 also includes:
- the first bearing 30, with its inner ring 31 secured around the drive shaft 11 and axially tightened by the nut 29 against the shoulder 19 of the stepped portion of the drive shaft 11;
- the annular cover 70, the drive shaft 11 being received in the central opening 71, and the annular seal 72 being mounted between the drive shaft 11 and said central opening 71. The annular cover 70 is thus mounted around the drive shaft 11, and is located between the first bearing 30 and the joint 110.

A bearing rotation lock 35 can further be provided on the side of the first bearing 30 that is opposite the annular cover 70, i.e. towards the inside of the differential unit 10.

The annular cover 70 comprises at least one aperture 74 (see FIG. 11), preferably several apertures 74 arranged substantially on one and the same circle around axis 115. When looking axially towards the differential unit 10, the apertures 74 are located in an area A74 which is at least partially included in the joint enveloping cylinder C. However, the annular cover 70 is placed or can be placed around the drive shaft 11 so that the apertures 74 are in a circumferentially offset position from the joint 110, i.e. in a circumferentially offset position from both U-shaped pieces 116, 117.

The differential unit 10 is also prepared, with the differential 15, the first housing 24, the second bearings 40 (on either side of the joint cross 17), and possibly the blocking system 25.

Figure 11:
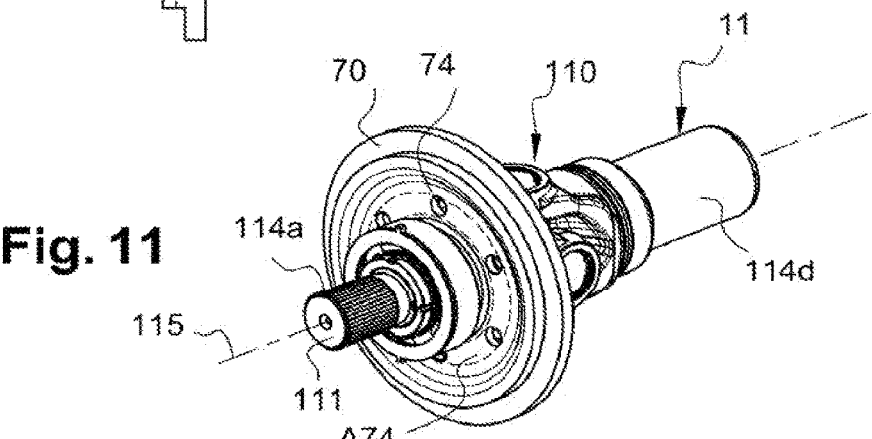
FIG. 11 is a perspective view of the drive shaft sub assembly of FIG. 10.
Figure 12A:
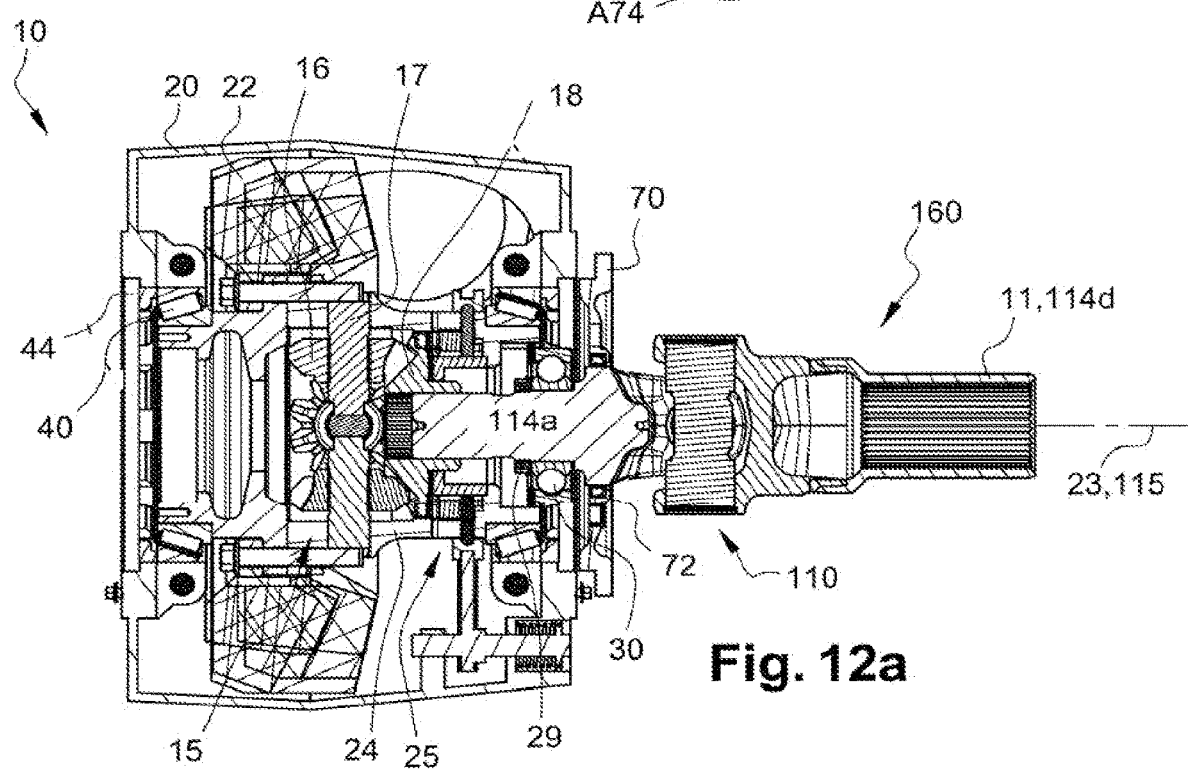
FIGS. 12a to 12d show various successive steps of the mounting process of an axle system comprising the drive shaft sub assembly of FIG. 10.

Then, as shown in FIG. 12a, the drive shaft sub-assembly 160 of FIG. 11 is inserted in the differential unit 10, The drive shaft sub-assembly 160 is then engaged in the assembly illustrated in FIG. 8b, in the first housing 24, in order to connect the drive shaft 11 to the differential unit 10, i.e. to insert the end of the drive shaft first portion 114a into the corresponding differential side gear 18 and to rotationally link the first portion 114a and the differential side gear 18. The first bearing 30 is thus placed between the drive shaft 11 and the first housing 24.

Figure 12B:
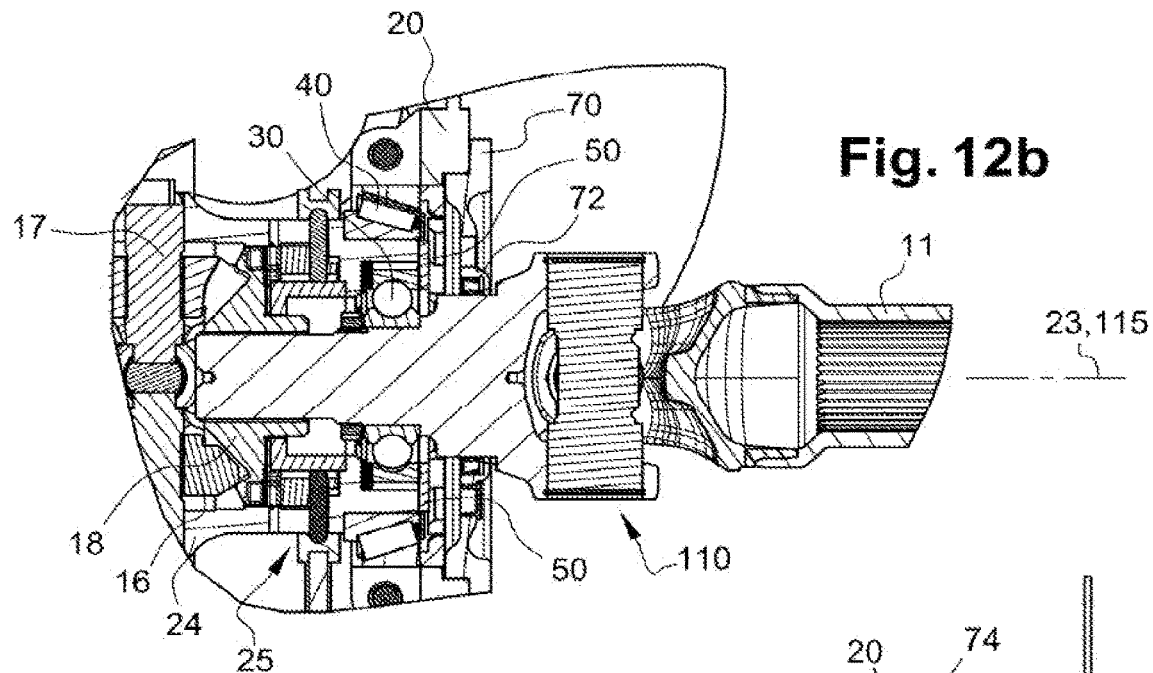
Figure 12C:
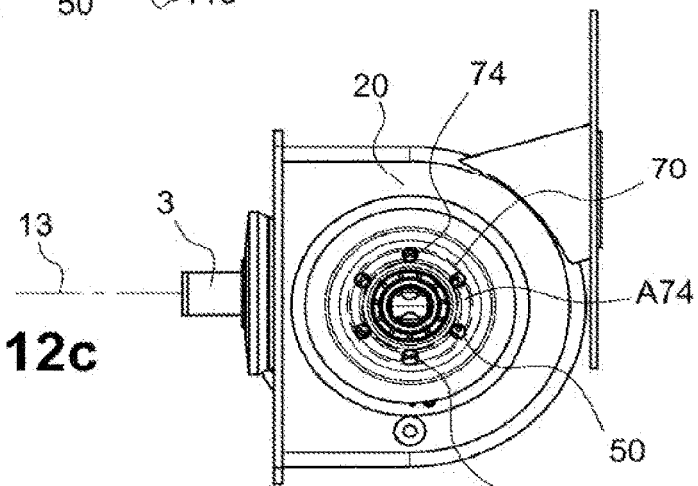
Figure 12D:
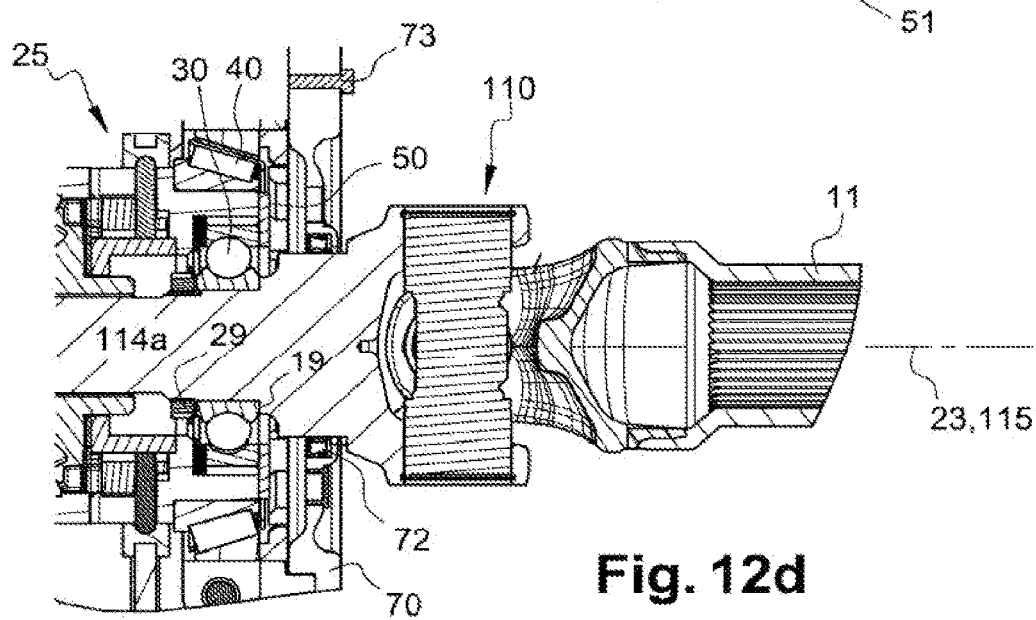

The engagement of the drive shaft 11 can continue until the first bearing 30 abuts against the first housing 24, as illustrated in FIG. 12b.

Then, the tightening phase of the first bearing outer ring 32 can be carried out, in order to axially lock the first bearing outer ring 32 relative to the first housing 24. To that end, in this embodiment, there are provided at least one tightening member 50 as a separate piece.

One tightening member 50 may comprise a plate configured for abutting against the outer ring 32 of the first bearing 30. The plate can be substantially flat. It is designed to be inserted through one aperture 74 of the annular cover 70, and therefore is dimensioned appropriately. Each plate 50 comprises at least one hole, and preferably at least two holes, which form a manoeuvring portion 51 of the tightening member 50, as a tool can be engaged in the hole 51 to move the plate 50 axially relative to the first housing 24.

There are preferably provided several tightening members 50, preferably one for each aperture 74.

In other words, in this embodiment, the tightening members 50 are arranged substantially on one and the same circle. Moreover, when looking axially towards the differential unit 10, the manoeuvring portions 51 are located in an area A74 at least partially included in the joint enveloping cylinder C but are circumferentially offset from the U-shaped pieces 116, 117 of the joint 110.

Then one tightening member, i.e. one plate 50, is inserted through several or each aperture 74, until it abuts against the outer ring 32 of the first bearing 30, as shown in FIG. 12b. The aperture 74 axially facing the tightening member 50, it allows access to the holes 51, i.e. the manoeuvring portions. The bearing 30 can thus be properly axially locked.

30 The annular cover 70 can then be removably plugged or fastened to the second housing 20, by means of the fasteners 73. The annular seal 72 is thus arranged between the drive shaft 11 and the annular cover 70 secured to the second housing 20.

Although this second embodiment has been described with a mechanical differential, it 35 could be implemented with a torque vectoring solution.

The invention applies to vehicles having an independent wheel suspension arrangement in which, for mechanical strength reasons, for providing enough space to allow operational movements of the components, and for improving fuel efficiency, the drive shafts must have a minimum length that may not be easily compatible with the legal constraints, namely the regulatory maximum transverse length of the vehicle.

In this context, the invention gives a solution for providing an axle system which offers both stronger support for the drive shafts, because of the first and second bearings, and robustness, as axial blocking is achieved without play which avoid relative movements and resulting components wear.

Moreover, the mutual arrangement of the bearings offers the required compactness, especially in the transverse direction of the vehicle.

Besides, the invention allows easing maintenance on the drive shafts, which can be disassembled without disassembling the differential (as disassembling the drive shafts occurs at an early stage of the disassembling process), and also easing maintenance on the seal, as it can be quickly changed, at least in the first embodiment.

The invention advantages are all the more significant as independent wheel suspension configuration is a key solution to develop an optimized electrified driveline, which is a promising development in transportation industry.

It is to be understood that the present invention is not limited to the embodiments described above and illustrated in the drawings; rather, the skilled person will recognize that many changes and modifications may be made within the scope of the appended claims.

The invention claimed is:

1. An axle system for a vehicle, having an axis and comprising: —a differential unit including a first housing and a second housing which is at least partially arranged around the first housing and which rotationally receives at least part of said first housing; —at least one drive shaft having one end configured to be connected to a wheel of the vehicle and one end connected to the differential unit and rotationally received in the first housing, the drive shaft including at least one joint connecting two portions of the drive shaft to transmit rotary motion between said portions, the joint having a radial dimension; —a first bearing secured around the drive shaft, placed between the drive shaft and the first housing; —a second bearing placed between the first housing and the second housing; characterized in that: —an outer diameter of the first bearing is smaller than the radial dimension of the joint; —and the axle system comprises at least one tightening member configured to axially lock a first bearing outer ring relative to the first housing, said tightening member comprising at least one manoeuvring portion which is arranged in an offset relation relative to the joint, when looking axially towards the differential unit, so that the tightening member manoeuvring portion is visible and accessible, at least during a tightening phase of an axle system mounting process.

2. The axle system according to claim 1, characterized in that the first bearing outer diameter is smaller than a second bearing inner diameter.

3. The axle system according to claim 2, characterized in that the first bearing and the second bearing have median planes which are orthogonal to the axis and which are substantially coincident.

4. The axle system according to claim 1, characterized in that the first housing comprises a radial wall and in that the tightening member is configured to axially tighten the first bearing outer ring against said radial wall.

5. The axle system according to claim 1, characterized in that the tightening member manoeuvring portion comprises at least one hole, recess or the like, configured to receive a tool capable of moving the tightening member axially relative to the first housing.

6. The axle system according to claim 1, characterized in that the tightening member comprises several manoeuvring portions which are all arranged in an offset relation relative to the joint, and which are arranged substantially on one and the same circle.

7. The axle system according to claim 1, characterized in that it comprises several tightening members, each tightening member comprising at least one manoeuvring portion which is arranged in an offset relation relative to the joint, the tightening members being arranged substantially on one and the same circle.

8. The axle system according to claim 1, characterized in that it further comprises an annular seal arranged between the drive shaft, or a part secured to the drive shaft, and the second housing, or a part secured to the second housing.

9. The axle system according to claim 1, characterized in that it further comprises an annular cover having a central opening for receiving the drive shaft, the annular cover being configured to be removably mounted on and/or fastened to the second housing after the tightening phase of the axle system mounting process.

10. The axle system according to claim 8, characterized in that the annular seal is mounted in a central opening of an annular cover.

11. The axle system according to claim 1, comprising a left drive shaft connected to the differential unit and configured to be connected to at least one left wheel, and a right drive shaft connected to the differential unit and configured to be connected to at least one right wheel, characterized in that the differential unit comprises a differential which mechanically links the two drive shafts, wherein at least one of the drive shafts is made to rotate:

by a crown wheel of the axle system which is connected to the differential and which is configured to be connected to an input shaft driven by a vehicle engine or by a vehicle electric motor;

or by at least one motor, through a transmission system.

12. The axle system according to claim 1, comprising a left drive shaft connected to the differential unit and configured to be connected to at least one left wheel, and a right drive shaft connected to the differential unit and configured to be connected to at least one right wheel, characterized in that the differential unit comprises at least one motor capable of rotating the left drive shaft through a transmission system, and at least one motor capable of rotating the right drive shaft through a transmission system, independently from the left drive shaft.

13. The axle system according to claim 1, characterized in that the manoeuvring portion of the tightening member is located in an area of the tightening member which is radially outside from a joint enveloping cylinder, which is the smallest cylinder which has its center on the axis, and which fully contains the joint when looking axially towards the differential unit.

14. The axle system according to claim 1, characterized in that the manoeuvring portion of the tightening member is located in a peripheral area of the tightening member.

15. The axle system according to claim 1, characterized in that the tightening member comprises a nut having:
 a tightening portion, such as a sleeve coaxial with the drive shaft, configured for abutting against the outer ring of the first bearing;
 and an outer annular flange comprising at least one notch which opens outwardly and which forms the manoeuvring portion.

16. The axle system according to claim 1, characterized in that an annular seal has an inner diameter that is larger than the radial dimension of the joint.

17. The axle system according to claim 16, characterized in that it comprises a contact piece secured around the drive shaft and having: —a blocking portion, configured as a sleeve coaxial with the drive shaft, configured for abutting against an inner ring of the first bearing; —a contact portion, configured as a cylindrical contact portion coaxial with the drive shaft, with which the annular seal is radially in contact, wherein the contact portion is radially inwardly offset relative to the tightening member manoeuvring portion.

18. The axle system according to claim 1, characterized in that, when looking axially towards the differential unit, the manoeuvring portion of the tightening member is located in an area at least partially included in a joint enveloping cylinder, which is the smallest cylinder which has its center on the axis, and which fully contains the joint, and the manoeuvring portion of the tightening member is circumferentially offset from the joint or each portion of the joint.

19. The axle system according to claim 1, characterized in that the tightening member comprises at least one plate configured for abutting against the outer ring of the first bearing, the plate being substantially flat, and having a transverse dimension less than the inner diameter of the first bearing.

20. The axle system according to claim 18, characterized in that an annular cover comprises at least one aperture substantially axially facing the tightening member, so as to allow access to the manoeuvring portion.

21. The axle system according to claim 1, characterized in that an annular seal has an inner diameter that is smaller than the radial dimension of the joint.

22. The axle system according to claim 1, characterized in that the drive shaft comprises a stepped portion including a transverse face which forms an axial abutment for the first bearing, and a cylindrical face which forms a contact portion with which an annular seal is in contact, the diameter of the cylindrical face being equal or larger than a first bearing inner diameter.

23. A drive shaft sub assembly for an axle system according to claim 1, the drive shaft having one end configured to be connected to a vehicle wheel and one end connected to a differential unit of the axle system, the drive shaft including at least one joint connecting two portions of the drive shaft to transmit rotary motion between said portions, the joint having a radial dimension, characterized in that the drive shaft sub assembly comprises: —a first bearing having an inner ring secured around the drive shaft, the outer diameter of the first bearing being smaller than the radial dimension of the joint; —a tightening member, configured as a nut, having a tightening portion which is configured for abutting against the outer ring of the first bearing and a manoeuvring portion which is radially outwardly offset from the joint, when looking axially towards the differential unit; —and a contact piece secured around the drive shaft, having a blocking portion which is configured for abutting against the inner ring of the first bearing, and a contact portion for an annular seal, said contact portion being cylindrical, radially inwardly offset relative to the tightening member manoeuvring portion, and having a diameter larger than the radial dimension of the joint.

24. A drive shaft sub assembly for an axle system according to claim 1, the drive shaft having one end configured to be connected to a vehicle wheel and one end connected to a differential unit of the axle system, the drive shaft including at least one joint connecting two portions of the drive shaft to transmit rotary motion between said portions, the joint having a radial dimension, characterized in that the drive shaft sub assembly comprises: —a first bearing having an inner ring secured around the drive shaft, the outer diameter of the first bearing being smaller than the radial dimension of the joint; —an annular cover having a central opening in which the drive shaft is received, an annular seal being mounted between the drive shaft and said central opening, the annular cover being located between the first bearing and the joint and comprising at least one aperture which, when looking axially towards the differential unit, is located in an area at least partially included in a joint enveloping cylinder, which is the smallest cylinder which has its center on the axis, and which fully contains the joint and can be placed in a circumferentially offset position from the joint or each portion of the joint, the aperture being configured to allow a tightening member to be inserted through it until it abuts against the outer ring of the first bearing.

25. A driven wheel system for a vehicle, comprising an axle system according to claim 1, at least one left wheel and at least one right wheel, the axle system comprising a left drive shaft connected to the differential unit and to the left wheel(s), and a right drive shaft connected to the differential unit and to the right wheel(s), each wheel being further connected to the differential unit by at least one lower arm articulated at both ends and at least one upper arm articulated at both ends.

26. A vehicle comprising at least one driven wheel system according to claim 25.

27. A process for mounting an axle system according to claim 1, comprising the following steps:
 a) providing a differential unit with a second bearing placed between the first housing and the second housing;
 b) providing a drive shaft sub-assembly comprising a drive shaft including at least one joint connecting two portions of the drive shaft to transmit rotary motion between said portions, the joint having a radial dimension, the drive shaft sub-assembly further comprising a first bearing having an inner ring secured around the drive shaft, the outer diameter of the first bearing being smaller than the radial dimension of the joint;
 c) providing a tightening member;
 d) after steps a), b) and c), engaging the drive shaft sub-assembly in the first housing so that the first bearing is placed between the drive shaft and the first housing, and connecting the drive shaft to the differential unit;
 e) after step d), tightening the tightening member in order to axially lock the first bearing outer ring relative to the first housing in the mounted position.

28. The process according to claim 27, characterized in that, in step c), the tightening member is provided as a piece mounted on the drive shaft, before the drive shaft sub-assembly is engaged in the first housing.

29. The process according to claim 27, characterized in that, in step c), the tightening member is provided as a separate piece, and in that the tightening member is assembled to the axle system once the drive shaft sub-assembly has been engaged in the first housing.

\* \* \* \* \*